COILED ELECTRODE BATTERY

Filed Nov. 18, 1959

INVENTOR.
MYRON A. COLER
SIDNEY A. CORREN
BY
Leonard H. King

United States Patent Office 3,023,260

Patented Feb. 27, 1962

1

2

3,023,260

COILED ELECTRODE BATTERY

Myron A. Coler, 56 Secor Road, Scarsdale, N.Y., and Sidney A. Corren, 163 Cherry St., Katonah, N.Y.

Filed Nov. 18, 1959, Ser. No. 853,824

4 Claims. (Cl. 136—13)

This invention relates to improved batteries employing coiled electrode structures.

One feature of the invention disclosed hereinafter is the provision of a battery than can be positioned around other equipment where space is a consideration as, for example, a component of a missile.

In the copending application of Sidney A. Corren, entitled "Integral Electrode-Separator Structure," filed concurrently herewith, there is claimed a porous separator and electrode particle retention means for battery electrodes formed in situ on the electrode. The separator is formed by wrapping the electrode with a porous fibrous layer of a material resistant to the electrolyte, the wrapped layer and electrode is then impregnated with a composition containing a suitable water-insoluble resin in a water-soluble solvent and a dispersed water-swellable polymer.

The solvent employed is water-soluble and chemically non-reactive with the resin or polymer. After solution of the resin is complete, there is dispersed therein the water-swellable polymeric material which is not soluble in the water-soluble solvent. The electrode is then coated with the composition containing the dispersed water-swellable material. In turn, the coated electrode is immersed in water so as to dissolve out the water-soluble solvent and thereby fix a porous resin coating over the electrode.

Still other advantages and objects of this invention will be specifically pointed out or will in part be obvious as the following description proceeds in conjunction with the accompanying drawing.

Figure 1:
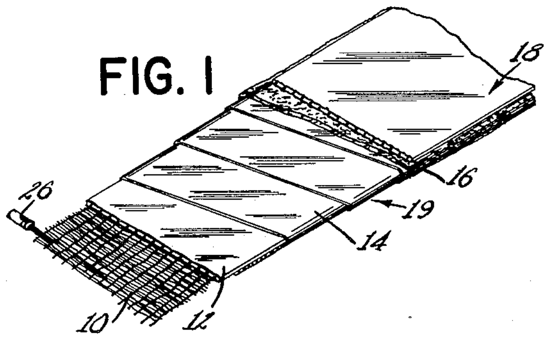
FIG. 1 is a pictorial representation of an encapsulated electrode and a portion of a second electrode in juxtaposition.

In FIG. 1 there is shown a flexible electrode which incorporates a wire mesh 10. The wire is selected of a metal non-reactive with the components of the particular electrochemical system employed. The mesh is encapsulated in an electrode composition 12. The composition 12 includes an active electrode material and an electrically conductive synthetic resin binder composition. The electrode is spirally wrapped with overlapping layers of a synthetic resin fabric 14 which is chemically resistant to the electrolyte for the particular electrochemical system involved. The wrapped electrode is then impregnated with a porous resin coating 16 of the type described earlier. The resulting covered electrode 19 is then assembled in juxtaposition with an electrode of opposite polarity and placed in a suitable container to which is introduced electrolyte solution. Connection is made to the electrodes by terminals 26 welded to mesh 10.

EXAMPLE 1

In making the flexible electrode, a nickel wire screen formed of 0.007" diameter wire woven 40 x 60 wires per inch is employed as an electrically conductive support. Employing the process, more fully described hereinafter, the mesh was coated with a mixture of nickel hydroxide and an electrically conductive polyvinyl chloride composition to form an electrode having a thickness of 0.025".

The electrode was spirally wrapped with an overlapping layer of nylon cloth 0.004 inch thick and weighing 1.46 ounces per square yard. A 2" overlap was provided. After wrapping with the overlapped layer of nylon cloth, the wrapped electrode was impregnated as follows:

A resin coating composition was prepared by dissolving 67 grams of an 80% polyvinyl chloride: 20% polyacrylonitrile copolymer in 540 grams of dimethyl formamide by means of a high-speed propeller mixer. Then 200 grams of polyvinyl alcohol, having a molecular weight of about 1500, was dispersed therein and mixing continued for five minutes. The wrapped electrode was then soaked in the resulting composition so as to thoroughly impregnate the wrapping.

The wet coated electrode was then dipped into water at room temperature (68° F.) in order to fix the coating by dissolving out the dimethyl formamide.

A negative electrode composition containing cadmium oxide, cadmium powder, and polyvinyl chloride, as a binder, was applied to a 30" x 2.5" nickel screen of similar mesh size to form a negative electrode strip having an overall electrode thickness of 0.019" by the process more fully described hereinafter. The negative electrode 18 was then positioned against the coated positive electrode 19. The electrodes were then wound together, in a tight spiral, so as to fit within a tubular casing as will be disclosed hereinafter.

Figures 2, 4:
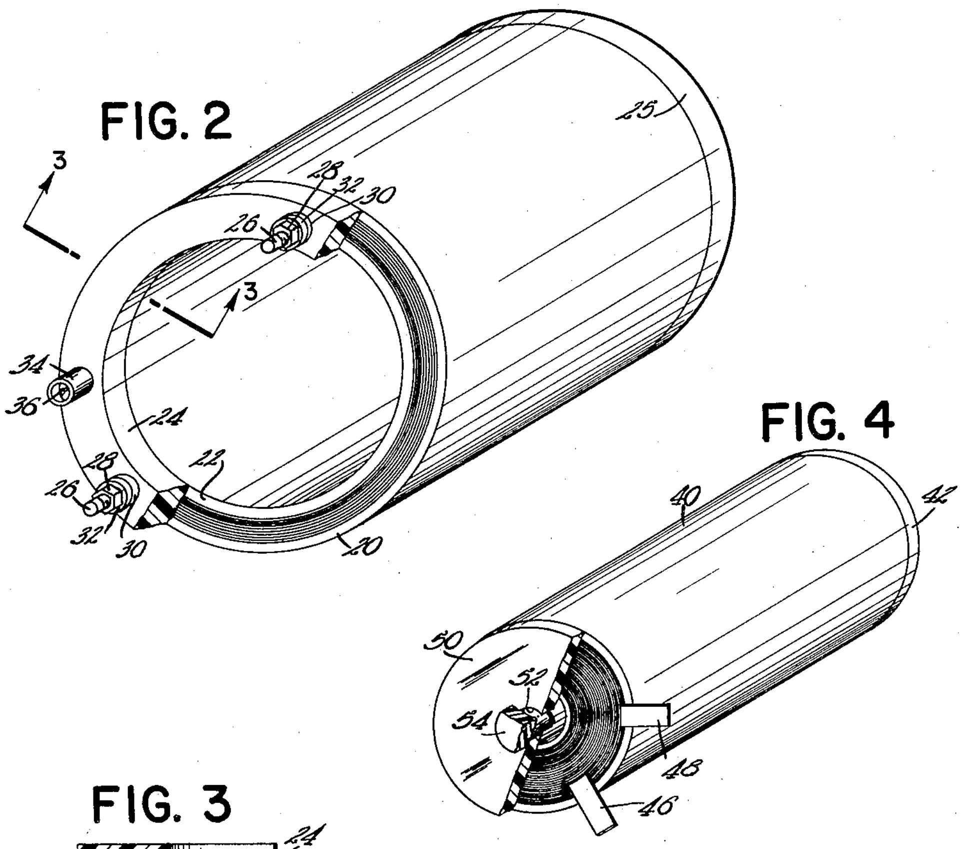
FIG. 2 shows pictorially a hollow cylindrical battery with a portion of a cover ring broken away to expose the electrode structure.
FIG. 4 shows pictorially and partially broken away an alternate embodiment of a cylindrical battery employing a flexible electrode.
Figure 3:
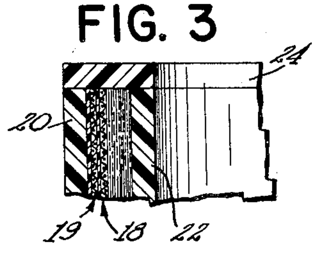
FIG. 3 is a cross section taken along lines 4—4 of FIG. 3.

The hollow cylinder battery cell, shown in FIGURES 2 and 3, was formed of two concentric methyl methacrylate tubes 20 and 22. The tubes were sealed to rings 24 and 25 of the same material. One such cell cavity was formed of 3" long sections of 1/8" wall tubing having 3" O.D. for the inner tube 22, and a 3¾" O.D. for the outer tube. Electrodes prepared as described above and having a length of 20" were employed.

The method of assembly was as follows:

An inner tube 22 was solvent sealed, to a bottom ring 25, using methylene dichloride as the solvent. The negative and positive electrode assembly was then wrapped around inner tube 22.

The outer tube 20 was then slipped over the plates and solvent cemented to the bottom ring 26 using methylene dichloride as the solvent. The terminal posts 26 were passed through holes provided in the top ring 24 and secured with nickel nuts 28 under which were positioned neoprene rubber gaskets 30 and nickel washers 32. The top ring was then solvent cemented to both tubes.

Electrolyte, in this instance a 25% by weight potassium hydroxide solution, was added through the filling port 34. The internally threaded port 34 was closed by a threaded plug member 36.

Batteries made as described, when tested under discharge, provide an actual capacity of 5.5 to 8.8 ampere hours, depending on the rate of discharge, measured to a 0.6 v. cutoff point.

In FIGURE 4 there is shown an alternate embodiment of the battery cell assembled of a 1/8" thick 1½" O.D. polymethyl methacrylate tube 40, solvent sealed to a 1/8" thick polymethyl methacrylate bottom member 42.

In constructing the battery shown in FIGURE 4, a set of electrodes identical (except for terminals and length) to the ones employed in the hollow cylinder embodiment of FIGURE 2 were wound about a ½" O.D. phenolic tube 44. Both positive and negative electrodes were 20" x 2.5" in size. The tube and wrapped plates were then inserted into the cell cavity. Terminal members 46 and 48, welded to the wire mesh supports of the respective electrodes, were positioned in slots formed in the upper edge of tube 40. A 1/8" thick polymethyl methacrylate cap member 50 was then sealed to the end of tube 40. A sealing cement comprising polymethyl methacrylate and methylene dichloride was used to seal the terminals to the tube 40 and cap member 50 so as to prevent electrolyte leakage between the terminal and the polymethyl methacrylate housing. A 25% potassium hydroxide solution was introduced through opening 52. The opening was then closed with a polymethyl methacrylate plug 54. The plug 54 was solvent sealed to the cover 50.

Batteries made as described, when tested under discharge, provide an actual capacity of 3.6 to 6.0 ampere-hours, to a 0.6 v. cutoff point.

A. *Preparation of Flexible Positive Electrode*

The following example will serve to further illustrate the preparation of the postive electrode of Example 1.

(1) PREPARATION OF CONDUCTIVE PLASTIC

Conductive plastic was prepared by mixing about 52 grams of VYHH, a copolymer of polyvinyl chloride and polyvinyl acetate, with 49 grams of acetylene black and with 200 cc. of methyl ethyl ketone in a Waring Blendor. The resulting intimate admixture was air dried for two hours in open porcelain drying trays and then oven dried at about 80° C. overnight (12 hours). The resulting cake was micropulverized in a high-speed Metals Disintegrating Co. Bantam Micropulverizer to yield the finely divided conductive plastic powder constituting one constituent of the positive plate.

(2) INCORPORATION OF NICKEL HYDROXIDE

Forty-five grams of conductive plastic power were mixed with a hot concentrated solution of nickel nitrate formed by dissolving 250 grams of $Ni(NO_3)_2.6H_2O$ in 225 cc. of distilled water. The nickel nitrate solution appeared to wet the conductive plastic powder when mixed at high speed by a Waring Blendor (a high speed propeller mixer), and was converted to nickel hydroxide by the addition of a hot solution of 180 grams of NaOH in 200 cc. of distilled water to the nickel nitrate-containing solution.

After continuing the blending to insure an intimate admixture, the contents of the Waring Blendor were discharged into a 4-liter settling tank in which the solids settled. The clear supernatant liquid was decanted off the mixture and the mixture was reslurried with more distilled water. After settling, as before, the solids were separated from the overlying liquid by decantation and further washed by a repetition of reslurrying and decantation. The recovered solids were given a final washing on a Buchner filter by rinsing with distilled water until the filtrate obtained had a pH of less than 8. The filter cake was removed from the Buchner filter and was dried in a drying oven, overnight, at about 60° C.

The nickel hydroxide-conductive plastic filter cake was broken up by a high speed micropulverizer. At this stage it may be stored for future use. In the present example, it was discharged through the 1/32" screen discharge of the micropulverizer directly into a vessel wherein it was combined with other electrode forming constituents.

(3) PLATE PREPARATION

An intimate mixture was formed consisting of about 200 grams of micropulverized conductive plastic power, containing nickel hydroxide prepared as above outlined, about 2.8 grams of filter paper, 320 cc. of benzine, and 480 cc. of methyl ethyl ketone, by blending the ingredients in a Waring Blendor run 5 minutes at high speed and 5 minutes at low speed. The contents of the Blendor were discharged into an open tank. Several such Blendor charges were combined in a tank provided with means to keep the slurry agitated. A strip of 40 x 60 mesh nickel screen, 3 inches wide, was payed out from a supply roll and led through the tank, over suitable guides, through a draining region and past several infrared heat lamps for removal of solvent. Several such passes through the tank of agitated slurry, draining region and drying lamps were made.

(4) PLATE FINISHING

The first step in finishing the plates was to cut the above processed strips into desired lengths and trim the width to 2½ inches. Each 20 inch plate contained about 33.5 grams, and each 30 inch plate about 50.2 grams, of the nickel hydroxide-conductive plastic-filter paper containing mixture. The treated web was then dusted with Dixon 200–10 graphite dust (average size, 2½ microns). The flexible coated mesh was then passed through heated pressure rolls (100° C.) and finally through unheated rolls. By this procedure the strip was reduced from an initial thickness of 0.040 to 0.060 inch to a final thickness of 0.025 inch. The wire mesh was exposed at a corner of each plate and a nickel tab 0.28" x 4" x 0.006" was welded thereto.

In the foregoing outline, the procedure has been discussed in terms of the specific plates employed in Example 1. It will be evident that other proportions and even other ingredients may be substituted for those disclosed, without departing from the invention and that instead of nickel screen other suitable materials may be used as a source of electrons on discharging and a collector of electrons on charging.

For example, in the conductive plastic powder, instead of the specified mixture of acetylene black and polyvinyl chloride-polyvinyl acetate copolymer in the proportions stated in the foregoing example, the relative proportions may be varied between 80:20 and 35:65 by weight. A preferred ratio is one consisting of about equal parts by weight (e.g. 49:52). Other electrically conductive materials may be employed in place of the acetylene black. For example, nickel-coated acetylene black prepared by chemical plating as described for example in United States Patent 2,690,402, or graphite, may be used to furnish the desired electrical conductivity in the final plate composition, either as the sole conductive material or in admixture with other materials.

The relative proportions of conductive plastic to the other constituents may be varied considerably. With the conductive plastic employed, the ratio of nickel hydroxide to conductive plastic may be varied between 1:4 and 4:1 by weight, but the optimum results were achieved with a ratio of 3 parts by weight of nickel hydroxide to 2 parts by weight of conductive plastic.

The amount of liquid added to the system depends principally on the method chosen for applying the resulting slurry to the solid support. For dipping, as illustrated in the specific example above, a ratio of 20 parts by weight of solid in 100 parts by weight of slurry has been found suitable. Alternatively, the active constituents may be applied by spraying a similar composition onto the screen, or by painting or by other conventional coating procedures. Furthermore, with methyl ethyl ketone and benzine as the liquids, they may be used in varying relative proportions, relative proportions from 3:1 to 1:2 have yielded satisfactory results, with optimum results at about 3:2. It should be noted that the ratio of methyl ethyl ketone to benzine is selected to swell but not to dissolve the resin binder. Other combinations of solvent and diluent may be substituted according to the specific polymer employed.

In the process described, the conductive plastic may be prepared with any one or more of the presently well-known alkali-resistant polymers such as polystyrene, polyacrylonitriles, polymethylmethacrylates, or other polyvinyls in place of the copolymer described in the specific example above, provided a suitable mixture of liquids is selected from those known to swell the polymer employed.

Similarly, other liquids than the combination of benzine and methyl ethyl ketone disclosed in the specific example may be used to slurry the mixture of conductive plastic and nickel hydroxide, provided the liquids used swell the plastic, at least to a limited extent and disperse the ingredients sufficiently to permit the deposition of a uniform composition on the nickel screen or other electron source means.

In the composition the filter paper preferably constitutes about 1.4% of the slurry, by weight. Other fibrous cellulosics swellable by the electrolyte may be substituted, in comparable amounts, e.g. from about 0.5% to 3% by weight. It has been found that the incorporation of the filter paper noticeably improved the durability and the practical current density on discharge.

The preparation of the active material involves two drying stages after various ingredients have been formed into desired mixtures. The first drying stage, in which the conductive plastic itself is dried, is preferably carried out at about 60° C. but satisfactory results may be obtained at temperatures of from 25° C. to 180° C. In the second drying stage of the process in which a conductive plastic-nickel hydroxide composition is being dried, an upper temperature limit is imposed by deterioration of the nickel hydroxide. Consequently, while 60° C. is again the preferred drying temperature, the range for satisfactory results extends from 25° C. to only 100° C., and 100° C. should not be exceeded for any great length of time.

The susceptibility of nickel hydroxide to deterioration also limits the range of rolling temperatures, a range of 25° C. to 120° C. having been found to yield suitable results, 100° C. being preferred. The rolling schedule may also be varied both as to the number of passes and the extent of the draft taken with each pass which in turn depends to some extent on the rolling facilities employed. One rolling schedule practiced entailed 15 passes with drafts sufficient to reduce the plate thickness about 60%. In other instances, the number of passes has been decreased to as few as 5 or increased to as many as 30 without unfavorably affecting the properties of the resulting plates, to any noticeable extent, corresponding changes having been made in the drafts to achieve the same overall reduction in thickness. The amount of reduction may range between 25% and 75% but in any event the final plate thickness should yield a ratio of material weight exclusive of the screen to plate volume of about 18–19 g./cu. in.

B. *Preparation of Flexible Negative Electrode*

(1) PREPARATION OF MIXTURE OF CHEMICALLY ACTIVE AND ELECTRICALLY CONDUCTIVE MATERIALS

Into a four-liter vessel there were charged 300 grams of cadmium oxide powder, 660 grams of cadmium metal powder and 1000 grams of steel balls, ⅛ inch in diameter. By turning the vessel at 60 r.p.m. for a considerable time, the steel balls were caused to mill the other constituents and to form a uniform blend of particles less than 50 microns in diameter. After thorough intermixing, e.g. after about 10 hours, the contents of the vessel were screened through a ten-mesh screen whereby the balls were separated from the remainder of the contents.

(2) INCORPORATION OF MIXTURE WITH ELECTRON SINK

About 346 grams of the ball-milled mixture were mixed in a Waring Blendor with a solution consisting of about 6.9 grams of VYHH which is a copolymer of polyvinyl chloride and polyvinyl acetate, dissolved in 115 cc. of methyl ethyl ketone. Several such Blendor charges were combined in a tank provided with means to keep the slurry agitated. A strip of 40 x 60 mesh nickel screen, 3 inches wide, was payed out from a supply roll and led through the tank, over suitable guides, through a draining region and past several infrared heat lamps for removal of solvent. Several such passes through the tank of agitated liquid, draining region and heat drying lamps were made.

(3) PLATE FINISHING

The first step in finishing the plates was to cut the above processed strips into desired lengths and trim the width to 2½ inches. Each 20 inch plate contained about 80.5 grams and each 30 inch plate contained about 121 grams of the cadmium oxide, cadmium, and plastic binder mixture. The coated mesh was then dusted with Dixon 200–10 graphite dust (average size, 2½ microns). The flexible web was then passed through heated pressure rolls (100° C.) and finally through unheated rolls. By this procedure the strip was reduced from an initial thickness of 0.030 to 0.040 inch to a final thickness of 0.019 inch. The screen was exposed at a corner of each plate and a nickel tab 0.28" x 4" x 0.006" was welded thereto.

In the foregoing outline, the procedure has been described in terms of the specific plates employed in the examples. It will be evident that other proportions and even other ingredients may be substituted for those disclosed, without departing from the invention and that instead of 20 mesh nickel screen, other suitable materials may be employed as a source of electrons on charging and as a collector of electrons on discharging.

For example, instead of the specified mixture of cadmium and cadmium oxide in the proportions stated in the foregoing example, satisfactory results have been obtained with electrodes in which the relative proportions of cadmium to cadmium oxide have been varied between 100% cadmium plus 0% CdO to 20% cadmium, plus 80% CdO by weight. A preferred ratio is one consisting of 69 parts by weight of cadmium and 31 parts by weight of CdO. Other electrically conductive materials may be employed in place of the cadmium. Thus, iron, nickel, silver, and acetylene black and other forms of carbon, have each been used in place of cadmium to furnish the desired electrical conductivity in the plate composition, and mixtures of these ingredients have been used for the same purpose. Other chemically reactive materials may be used in place of the cadmium oxide, according to the particular battery specifications to be satisfied. Thus, powdered iron oxide, or other reactive materials alone or in combination may be used in the process. With cadmium oxide as the chemically reactive material, cadmium is preferred and it appears that it has the advantage of supplying additional activity and possibly improving the retenton of capacity on repeated cycling. With iron oxide, powdered iron would be preferred.

Both the cadmium and cadmium oxide or their equivalents are preferred finely divided. In the specific example above the cadmium used was minus 325 mesh (Tyler standard) and all of the cadmium oxide was an impalpable powder which was passed through a 60 mesh screen prior to ball milling to break up any large agglomerates of the very fine material. Powdered materials 80 mesh or finer have been used with satisfactory results.

Furthermore, other nickel wire screens, electroformed nickel screen 0.004" thick, 20 holes to the inch, nonwoven screens, perforated metal sheets, metal paper formed of metal fibers, and even loosely matted fibers have each been used.

The relative proportions of binder to the other constituents may be varied considerably, provided the amount of binder is kept below that which would completely insulate the individual particles of cadmium and cadmium oxide. This corresponds to a maximum of 4% by volume of resin. With polyvinyl chloride-polyvinyl acetate copolymer, from 1% to 4% by weight of polyvinyl chloride-polyvinyl acetate copolymer for each 99% to 96% by weight of finely divided cadmium and cadmium oxide in the particle sizes stated above gave good results, about 2:98 being preferred. Any one or more of a large number of alkali-resistant polymers have been used satisfactorily as binders included polystyrene, polymethylmethacrylate, polyvinyl chloride and the like, each of which was used with a suitable known solvent for the polymer.

The amount of liquid added to the system depends principally on the method chosen for applying the resulting slurry to the electron sink material. For dipping, described in the specific example above of our preferred practice, a ratio of 21 parts by weight of methyl ethyl ketone in 100 parts by weight of slurry has been found suitable. The active constituents may be applied by repeated applications of the wet mixture, for example spraying, or by other conventional coating procedures such as doctoring or painting.

Instead of the slurry of cadmium and cadmium oxide, described above, a mixture of the following constitutents:

| | Percent by weight |
|---|---|
| Cadmium oxide | 30 |
| Carbonyl iron | 66 |
| Polyvinyl chloride-polyvinyl acetate copolymer | 4 |

was prepared as a slurry in sufficient methyl ethyl ketone to yield a creamy consistency.

It will be seen that a wet process has been devised for producing negative electrodes without the use of sintering. The negative electrodes produced possessed great flexibility and ruggedness. The cadmium-cadmium oxide plates described have been found to retain their physical and electrical integrity over a wide range of operating conditions. Neither the charging rate nor the discharge rate is critical. Typical electrodes produced by the above processes had capacities of at least 6 ampere hours per cubic inch and could be rolled up or otherwise formed into intricate shapes in specialized applications, requiring same.

The most suitable materials presently known for the porous resin film are polyvinyl chlorides and polyvinyl chloride compositions containing other polymers and, in particular, copolymers, containing from 50% to 80% polyvinyl chloride and the balance polyacrylonitrile.

Other resins useful for this purpose are polyvinyl acetate, polyvinyl butyral, cellulose acetate, polyvinylidene chloride, and compositions containing both polyvinyl chloride and polyvinyl acetate.

Suitable swellable materials include starch, gelatin, cold water insoluble polyvinyl alcohol, zein, carboxy methyl cellulose, carboxy ethyl cellulose, and collagens such as bone glues.

The water-swellable material should be present in a range of from at least ½ part to 6 parts per each part of water-insoluble resin.

It is desirable to employ a maximum amount of water-swellable polymer consistent with maintaining adequate mechanical film strength.

The quantity of solvent present in the solution of resin containing the dispersion of water-swellable resin as applied to the elctrode is limited in the low end of the range to the quantity required to produce a fluid composition having a viscosity suitable for coating. The high end of the range of the quantity limitation is critical and the applied composition may not contain more than 95% solvent by weight.

Suitable woven or matted fibrous wrapping materials include: cellulose acetate, glass fiber, polyethylene, polytetrafluoroethylene, polyesters such as Dacron, acrylics such as Orlon and Acrylan, polyacrylonitrile, cellulose products and copolymers of polyvinyl chloride and acrylonitrile such as Dynel. The list is intended merely by way of illustration and shall not be construed as limiting.

The fibers should not be subject to excessive swelling in the electrolyte and should not be soluble in it.

The resin, the water-soluble solvent for the resin, and the water-swellable polymer should be mutually non-reactive and chemically resistant to the electrolyte.

Fibers resistant to the action of particular electrolytes may be readily determined by reference to the published literature. For example, reference may be made to pages 856–861 of the "1955 Modern Plastics Encyclopedia Issue," where there is reported the chemical resistance properties of various synthetic resin fibers.

Unless specifically stated to be otherwise, it is intended that recited proportions be "by weight."

Having thus disclosed the invention, what is claimed is:

1. A battery comprising a sealed casing, an alkaline liquid electrolyte within said casing, a pair of flexible electrodes of opposite polarity immersed in said electrolyte, said electrodes being composed of a composition containing electrochemically active material, electrically conductive material, and a synthetic resin binder, said binder being present in sufficient quantity to bind said active material and said conductive material together but comprising less than 25% by volume of said composition and a flexible electrically conductive member embedded in the composition; an electrically conductive terminal member extending from each of the said electrically conductive members, at least one of said electrodes being encapsulated in a flexible sheath porous to said electrolyte, said sheath being composed of a synthetic resin woven fiber wrapping impregnated with a porous coating of a water-insoluble resin selected from the group consisting of: polyvinyl chloride, polyvinyl chloride-polyacrylonitrile compositions, polyvinyl butyral, cellulose acetate, polyvinylidene chloride, and polyvinyl chloride-polyvinyl acetate compositions, and distributed through said resin about 0.5 to 6 parts by weight, per part by weight of said water-insoluble resin, of a water-swellable polymer selected from the group consisting of: polyvinyl alcohol, zein, gelatin, starch, carboxy methyl cellulose, carboxy ethyl cellulose, and collagens; said casing comprising a closed tubular member formed of a rigid plastic non-porous to said electrolyte, said electrodes being wound in an intertwined helical relationship, and having said terminals extending through the casing; said water-insoluble resin, said water-swellable resin, said synthetic resin, and said casing being mutually non-reactive and chemically resistant to said electrolyte.

2. A battery comprising a sealed casing, an alkaline liquid electrolyte within said casing, a pair of flexible electrodes of opposite polarity immersed in said electrolyte, said electrodes being composed of a composition containing electrochemically active material, electrically conductive material, and a synthetic resin binder, said binder being present in sufficient quantity to bind said active material and said conductive material together but comprising less than 25% by volume of said composition and a flexible electrically conductive member embedded in the composition; an electrically conductive terminal member extending from each of the said electrically conductive members, at least one of said electrodes being encapsulated in a flexible sheath porous to said electrolyte, said sheath being composed of a synthetic resin porous cloth covering impregnated with a water-insoluble resin consisting of at least 50% polyvinyl chloride and the balance polyacrylonitrile, and distributed through said resin from 0.5 to 6 parts by weight of a water-swellable polymer, per part by weight of said water-insoluble resin, selected from the group consisting of: polyvinyl alcohol, zein, gelatin, starch, carboxy methyl cellulose, carboxy ethyl cellulose, and collagens; said casing comprising a closed tubular member formed of a rigid plastic non-porous to said electrolyte, said electrodes being wound in an intertwined helical relationship, and having said terminals extending through the casing; said water-insoluble resin, said water-swellable resin, said synthetic resin, and said casing being mutually non-reactive and chemically resistant to said electrolyte.

3. A battery comprising a sealed casing, an alkaline liquid electrolyte within said casing, a pair of flexible electrodes of opposite polarity immersed in said electrolyte, said electrodes being composed of a composition containing electrochemically active material, electrically conductive material, and a synthetic resin binder, said binder being present in sufficient quantity to bind said active material and said conductive material together but comprising less than 25% by volume of said composition and a flexible electrically conductive member embedded in the composition; an electrically conductive terminal member extending from each of the said electrically conductive members, at least one of said electrodes being encapsulated in a flexible sheath porous to said electrolyte, said sheath being composed of a woven synthetic resin cloth encasing said electrode, said cloth being impregnated with a coating composed of about 1 part by weight of polyvinyl chloride and distributed in said polyvinyl chloride from about 0.5 to 6 parts by weight of a water-swellable polymer selected from the group consisting of: polyvinyl alcohol, zein, gelatin, starch, carboxy methyl cellulose, carboxy ethyl cellulose, and collagens; said casing comprising a closed tubular member formed of a rigid plastic non-porous to said electrolyte, said electrodes being wound in an intertwined helical relationship, and having said terminals extending through the casing; said polyvinyl chloride, said water-swellable resin, said synthetic resin, and said casing being mutually non-reactive and chemically resistant to said electrolyte 4. A battery comprising a sealed casing, an alkaline liquid electrolyte within said casing, a pair of flexible electrodes of opposite polarity immersed in said electrolyte, said electrodes being composed of a composition containing electrochemically active material, electrically conductive material, and a sythetic resin binder, said binder being present in sufficient quantity to bind said active material and said conductive material together but comprising less than 25% by volume of said composition and a flexible electrically conductive member embedded in the composition; an electrically conductive terminal member extending from each of the said electrically conductive members, at least one of said electrodes being encapsulated in a flexible sheath porous to said electrolyte, said sheath being composed of woven nylon impregnated with about 1 part by weight, of a resin consisting of at least 50% polyvinyl chloride and the balance polyacrylonitrile, and distributed through said resin from about 0.5 to 6 parts by weight of polyvinyl alcohol; said casing comprising a closed tubular member formed of a rigid plastic non-porous to said electrolyte, said electrodes being wound in an intertwined helical relationship, and having said terminals extending through the casing; said nylon, said resin, said polyvinyl alcohol, and said casing being mutually non-reactive and chemically resistant to said electrolyte.

References Cited in the file of this patent

UNITED STATES PATENTS

| | | |
|---|---|---|
| 2,591,755 | Wilson et al. | Apr. 8, 1952 |
| 2,663,749 | Warner et al. | Dec. 22, 1953 |
| 2,673,230 | Brennan | Mar. 23, 1954 |
| 2,681,375 | Vogt | June 15, 1954 |
| 2,724,011 | Strauss | Nov. 15, 1955 |
| 2,729,694 | Ellis | Jan. 3, 1956 |
| 2,738,375 | Schlotter | Mar. 13, 1956 |
| 2,918,518 | Zablocki | Dec. 22, 1959 |

UNITED STATES PATENT OFFICE

CERTIFICATE OF CORRECTION

Patent No. 3,023,260 February 27, 1962

Myron A. Coler et al.

It is hereby certified that error appears in the above numbered patent requiring correction and that the said Letters Patent should read as corrected below.

Column 1, line 11, for "than" read -- that --; column 2, line 35, after "having" insert -- a --; column 6, line 48, for "preferred" read -- preferably --.

Signed and sealed this 18th day of December 1962.

(SEAL)
Attest:

ERNEST W. SWIDER
Attesting Officer

DAVID L. LADD
Commissioner of Patents